(12) United States Patent
Lamberts

(10) Patent No.: US 6,418,510 B1
(45) Date of Patent: Jul. 9, 2002

(54) COOPERATIVE CACHE AND ROTATIONAL POSITIONING OPTIMIZATION (RPO) SCHEME FOR A DIRECT ACCESS STORAGE DEVICE (DASD)

(75) Inventor: Bernd Lamberts, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 09/662,271

(22) Filed: Sep. 14, 2000

(51) Int. Cl.$^7$ .......................... G06F 12/00; G06F 12/14; G06F 12/16
(52) U.S. Cl. .................. 711/113; 711/133; 711/138; 711/159; 710/43
(58) Field of Search ................ 711/113, 133, 711/138, 159; 710/43

(56) References Cited

U.S. PATENT DOCUMENTS

| | | | |
|---|---|---|---|
| 5,729,718 A | 3/1998 | Au | 395/494 |
| 5,845,318 A | 12/1998 | Rose et al. | 711/113 |
| 5,991,825 A | 11/1999 | Ng | 710/6 |
| 6,272,565 B1 * | 8/2001 | Lamberts | 710/43 |

* cited by examiner

Primary Examiner—Do Hyun Yoo
Assistant Examiner—Ngoe Dinh
(74) Attorney, Agent, or Firm—Lumen Intellectual Property Services

(57) ABSTRACT

A cooperative disk cache management and rotational positioning optimization (RPO) method for a data storage device, such as a disk drive, makes cache decisions that decrease the total access times for all data. The cache memory provides temporary storage for data either to be written to disk or that has been read from disk. Data access times from cache are significantly lower than data access times from the storage device, and it is advantageous to store in cache data that is likely to be referenced again. For each data block that is a candidate to store in cache, a cost function is calculated and compared with analogous cost functions for data already in cache. The data having the lowest cost function is removed from cache and replaced with data having a higher cost function. The cost function C measures the expected additional cost, in time, of not storing the data in cache, and is given by $C=(T_d-T_c)P$, where $T_d$ is the disk access time, $T_c$ is the cache access time, and P is an access probability for the data. Access times are calculated according to an RPO algorithm that includes both seek times and rotational latencies.

24 Claims, 6 Drawing Sheets

COOPERATIVE CACHE AND ROTATIONAL POSITIONING OPTIMIZATION (RPO) SCHEME FOR A DIRECT ACCESS STORAGE DEVICE (DASD)

FIELD OF THE INVENTION

This invention relates generally to methods for improving performance of direct access storage devices (DASD) such as disk drives. More particularly, it relates to a disk drive cache management scheme that combines the cache and queuing algorithms according to a rotational positioning optimization (RPO) algorithm used in existing DASDs. Decisions are thus made with the goal of optimizing performance by considering both cache and queue structure.

BACKGROUND ART

Direct access storage devices (DASD) are commonly used in computers and network servers to store large quantities of digital information. Magnetic disk drives contain a number of flat, round, rotating disks, each of which has two surfaces coated with magnetic material organized into concentric tracks. Data is read from and written to the disks by a transducer or head connected to an actuator that moves the head to a desired track and maintains it over the track during read and write operations. In general, each surface is provided with its own read/write head, and all heads are connected to a common actuator. A typical disk surface 10 containing a number of concentric tracks 12 is illustrated in FIG. 1. Data is stored within a track in sectors 14 containing blocks of fixed size, usually 512 bytes, plus header and trailer information such as error correction data. The location of each sector is uniquely identified by its head, track (on a single surface) or cylinder (vertically aligned tracks of multiple surfaces), and sector. This geometric position is mapped to a logical block address (LBA), an indexing system for the drive. A read/write head 16 is formed on the end of an air-bearing slider 18 and suspended above surface 10 during data transfer. In response to a read or write command sent by a host computer, the actuator 20 moves the read/write head 16 to the proper track and sector defined by the logical block address.

Recently, both computer processor speeds and the volume of information capable of being stored on a hard drive have increased dramatically. As a result, the random input/output performance of disk drives, which has not increased at a comparably high rate, remains a limiting factor in many applications. A variety of metrics are used to describe the performance of disk drives. One important metric is the data access time, a measure of the time to position a read/write head over a particular track and locate the sector or sectors of interest within the track for reading or writing. Data access time is a measure of mechanical performance, i.e., the performance of mechanical functions that are controlled electronically, and thus typically the actual time to transfer data between the head and the disk, known as the data transfer rate, can be neglected. Data access time, measured in milliseconds, is a combination of two factors: seek time and rotational latency.

Seek time denotes the actuator movement time required to reposition the read/write head over the track or cylinder containing the first sector requested by the command. Seek time is a nonlinear function of the number of tracks to be traversed. Average seek times, defined as the time to position the read/write heads between two randomly selected tracks, currently range from 4 to 6 milliseconds.

Once the head is positioned over the appropriate track, it must wait for the sector requested by the command to rotate under it before data transfer can begin. The elapsed time for rotation is known as the rotational latency, which depends upon the disk's rotational speed. In the worst case scenario, the head reaches the desired sector just after the sector rotates past the head location, in which case the head must wait almost a full rotation before the desired sector is accessed. On average (in a non-RPO environment), the disk must spin one-half rotation before the desired sector is under the head. Average rotational latencies vary from 8.3 milliseconds for a rotational speed of 3600 RPM to 2 milliseconds for a rotational speed of 15,000 RPM. Note that for non-random disk accesses, rotational latencies are significantly lower.

A variety of methods have been employed to reduce the total data access time for a sequence of read and write commands. One method, known as command queue reordering, divides reception of the command sequence from the host controller and execution in the disk drive into two asynchronous processes. Commands are temporarily held in a command queue, where they can be reordered. Each command in the queue contains the instruction for the disk drive to read or write the data to a particular LBA on the disk. Commands consist of the operation type (read or write), starting LBA, and size of command in number of blocks. Commands are uniquely identified by a label, allowing them to be performed in a different order than the one in which they arrive at the controller. The idea behind command reordering is to reorder the commands in the queue to minimize the path length that the mechanical actuator must travel.

In the past, command reordering algorithms aimed to reduce only seek time. For example, the shortest seek time-first ordering algorithm examines all commands in the queue and selects the command with the shortest seek time, in either direction, from the end of the last sector of the currently executed command. The problem with this algorithm is that it completely ignores rotational latency, a significant portion of the data access time. The head might arrive at the next command track, only to find that the required sector had just spun past, requiring the head to stay in position until the next rotation of the disk.

Current command reordering techniques follow a rotational positioning optimization (RPO) algorithm, described in U.S. Pat. No. 5,729,718, issued to Au, and U.S. Pat. No. 5,991,825, issued to Ng. The RPO algorithm takes into account both seek time and rotational latency in reordering the command queue. The total access time for each command in the queue is computed with respect to the ending LBA of the command currently being executed, and the command having the shortest access time is moved to the front of the queue. The access time is calculated as the sum of the maximum of the seek time and head switch time, plus the rotational latency from the arrival point at the new command track to the desired sector location. The RPO algorithm therefore anticipates the above-described problem of arriving at the track just after the desired sector has spun past. RPO algorithms have been shown to increase the overall data throughput of the drive by about 20%.

Another way of improving disk drive performance is by employing a cache buffer memory array ("cache") in the disk controller. The cache provides temporary and limited storage of data blocks in transit between the host computer and storage locations on the disks. The purpose of the cache is to reduce the relatively long access time (e.g., milliseconds) associated with obtaining data from the storage device by maintaining the data in a higher speed memory, which has microsecond access times. The advantage of cache arises from the tendency of applications to make repeated references to the same or adjacent data. A disk drive cache typically has a selectable number of cache slots that are dynamically allocated as either read cache or write cache. When a read data command is executed, the data is both read into the read cache and transferred to the host computer. Subsequent requests for the same data may be fulfilled by the cache, saving significant amounts of time. In the case of write caching, data is stored in the cache before being written to the storage device, allowing parallel host-to-cache and cache-to-disk transfers. When the host computer issues a write command, and the data can be written to the cache, it will be transferred immediately, and the command does not need to enter the command queue. Data accumulated in the cache are subsequently written to the disk in clusters rather than individually, requiring less actuator movement in order to write a number of data blocks. Because cache is of limited size, it eventually becomes full, and newly received data either cannot be added or must replace data currently in the cache. If data is removed from the cache, it must be written to the storage device immediately.

The performance of the disk cache is characterized by hit ratios. A read cache hit occurs when data requested in a read command is found in the cache, eliminating the need for a disk access. A write cache hit occurs when the write command can be satisfied by writing the data to a free location in the cache for later transfer to the disk. The cache hit ratio, which can be defined for the read and write cache separately or for the cache as a whole, is defined as the ratio of the number of cache hits to the total number of commands. Obviously, it is desirable to increase the hit ratio, thereby minimizing the number of disk accesses and overall access time.

Disk caches are managed using algorithms that determine which data to destage (write to the drive) and stage (read from the drive) in order to maximize the cache hit ratio. Efficient algorithms are needed because the disk cache is expensive and therefore typically relatively small, so that only a fraction of read/write data can be stored in cache at a given time. Two standard cache management algorithms are the least recently used (LRU) and most recently used (MRU) algorithms. The LRU algorithm destages data that was either read or written the least recently of all data in the cache. The MRU algorithm retains in cache data that was most recently accessed or added. These schemes, and their numerous variations available in the art, rely on the assumption that data that was recently accessed will be accessed again.

A drawback of most disk cache management algorithms is that they do not seek to maximize the quantity that in part motivates the use of a cache: the decrease in data access time. A caching method that retains in the cache data that is most expensive to retrieve from the DASD is disclosed in U.S. Pat. No. 5,845,318, issued to Rose et al. A value is placed on each piece of data in the cache corresponding to the seek time from the current position of the read/write head and whether or not the cached data has been changed since being read from the DASD. Cached data is replaced if it is relatively inexpensive to access, i.e., if it is close to the current head position and if it does not require an immediate DASD access. The method of Rose et al. has a number of drawbacks. First, it considers only seek time in estimating access time. Second, it does not consider the importance of keeping data in the cache, i.e., whether it will be accessed in the future, independently of its access time. Third, it only considers the current position of the head in estimating access time for cache data. The combination of these three deficiencies makes it likely that the method of Rose et al. will not make the correct cache management decisions in the majority of cases.

There is a need, therefore, for an improved cache management scheme that optimally takes advantage of decreased data access times provided by the disk cache.

OBJECTS AND ADVANTAGES

Accordingly, it is a primary object of the present invention to provide a cache management method that takes into account the estimated access times of cached data, retaining in cache the data that is most costly to remove from cache.

It is a further object of the invention to provide a cooperative cache and command queue management method that improves both the cache hit ratio and the overall time to data for all commands in the command queue.

It is an additional object of the invention to provide a cache management method that uses a rotational positioning optimization (RPO) algorithm to estimate the access time of cached data.

It is another object of the present invention to provide a method that is flexible and can be adapted to different kinds of data storage systems and performance requirements.

SUMMARY

These objects and advantages are attained by a cache management method that makes cache decisions based on the access time of the commands under consideration. If a data block has a high access time, then it is preferentially added to or kept in the cache, while data with a low access time is preferentially not stored in cache. Decisions are made by considering the current state of the command queue. As a result, the total time to data of all commands in the command queue is reduced.

The present invention provides a method for optimizing performance of a data storage system that includes a direct access storage device (DASD) such as a magnetic disk drive, a data cache, and a command queue of commands for accessing data stored on the DASD. The method has the following steps: receiving a data block, either from the DASD during execution of a read command or from a host computer and corresponding to a write command; calculating a cost function C for not storing the data block in the data cache; calculating analogous cost functions for cached data blocks; and replacing a selected cached data block with the received data block, if the selected cached data block has a cost function that is lower than the cost function of the received data block. Preferably, the replaced data block has the lowest cost function of all cached data blocks. If the selected cache data block corresponds to a write command, then it is written to the DASD. The received data block may be received during a read-ahead operation.

The cost function C is given by $C=(T_d-T_c)P$, where $T_d$ is an access time for accessing the data block in the DASD, $T_c$ is an access time for accessing the data block in the data cache, and P is an access probability for the data block. Preferably, $T_d$ is calculated according to a rotational positioning optimization algorithm and depends on the logical block address of commands in the command queue. For example, $T_d$ may be an average of access times between the data block and each command in the command queue. Preferably, P depends upon the cached data blocks, the relative cache size, performance requirements of the data storage system, or a cache hit ratio.

The present invention also provides a disk controller containing a data cache buffer, a command queue, and means for carrying out steps of the above method.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention provides a method for optimizing performance of a data storage system. The key to the method is that cache decisions, i.e., which data to replace or read into the cache, are made based on the expected additional cost of not having the data in the cache in the future. Unlike prior art cache management schemes that consider only the likelihood of future reference of the data or adjacent data, the cost function of the present invention incorporates the estimated access times of the data from the storage device. Access times are estimated from the current state of the command queue according to a rotational positioning optimization (RPO) algorithm. The command queue is a particularly informative resource, because it indicates the current and near future commands, thus providing a realistic indication of whether the cached commands will be accessed easily in the future.

The method of the present invention is applicable to a wide range of storage devices and performance requirements. Any direct access storage device (DASD) for which an RPO algorithm is valid is within the scope of the present invention. The method will be described with reference to a magnetic disk drive, but it is to be understood that it may be applied to optical, holographic, or other storage devices. The specific implementations of the method are strongly tied to the system details; any details described below are intended for illustration purposes and in no way limit the scope of the present invention. It will be obvious to one of average skill in the art of data storage systems, upon reading this description, how to implement the invention best to meet the requirements of any particular system. It will also be obvious which additional system elements that are not mentioned herein must be modified in order to implement the present invention. While the following description is qualitative in nature, it is to be understood that implementation of the invention requires quantitative values that can be determined by one of average skill in the art.

Figure 1:
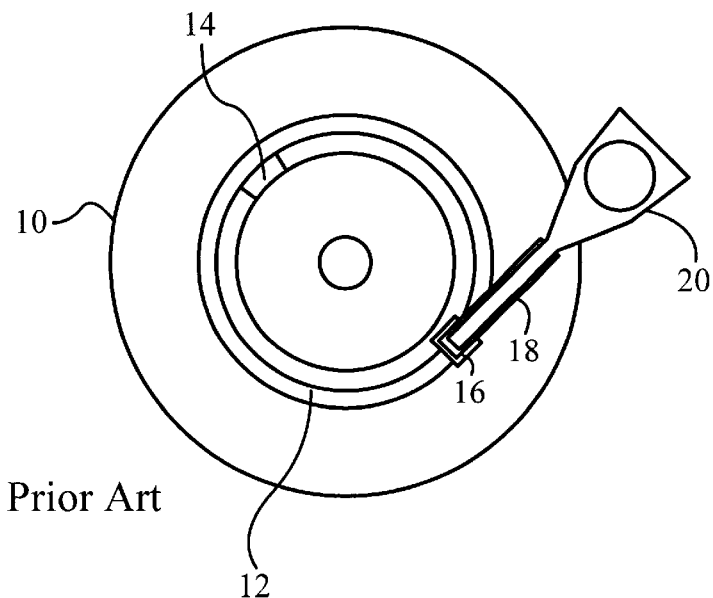
FIG. 1 is a schematic top plan view of a prior art disk drive surface.
Figure 2:
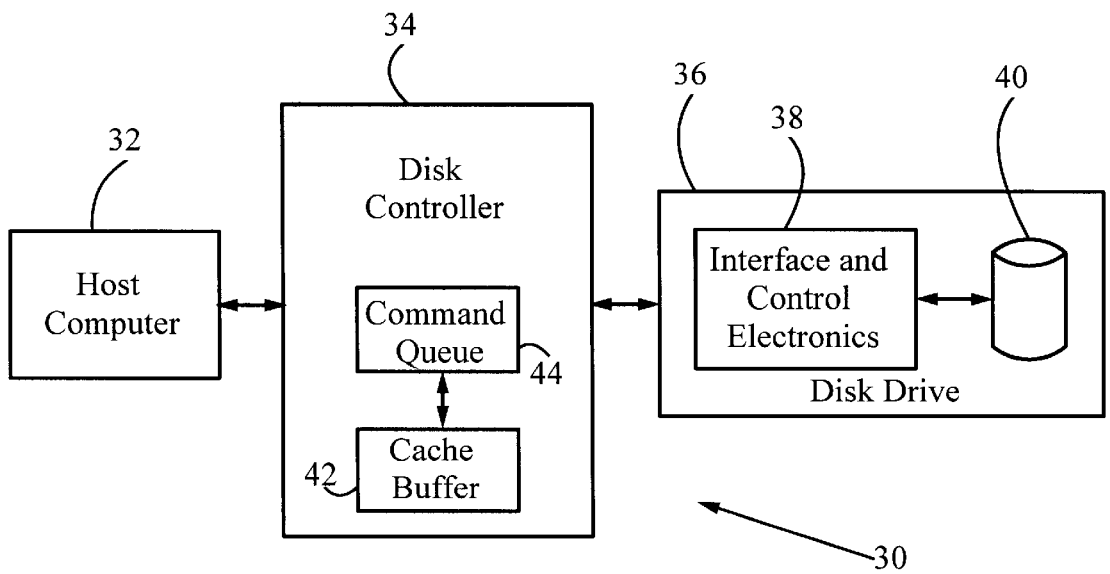
FIG. 2 is a block diagram of a computer system in which the present invention is implemented.

The invention is implemented in a computer system 30 illustrated schematically in FIG. 2. A disk drive 36 is electrically connected to a host computer 32 via a disk controller 34. Controller 34 provides a standard communication interface between host computer 32 and any type of disk drive 36, receiving commands into a command queue 44 and providing data and status values in response to the commands. Commands are sent from an initiator in host computer 32. Controller 34 also contains a cache buffer 42 that provides temporary storage of data blocks in transit between host computer 32 and storage locations on disks 40 in disk drive 36. Controller 34 keeps track of locations of data blocks in temporary storage in cache 42. Physically, controller 34 may be implemented as part of drive 36 or as a separate unit. Controller 34 is programmed to carry out the methods of the present invention; suitable programming techniques and languages are known to those of average skill in the art. Disk drive 36 also contains necessary electronics 38 for interfacing with controller 34 and for controlling the operation of the transducer and read/write head interacting with disk surfaces 40. The combination of controller 34 and disk drive 36 is referred to herein as a data storage system. Note that system 30 may represent any number of host computers, controllers, or disk drives.

To understand the variations of the method of the present invention, it is useful to consider three different types of disk drives and their corresponding performance requirements. A mobile disk drive is used in laptop and notebook computers and therefore must be relatively inexpensive and mechanically simple. The cache of a mobile drive is relatively small, as measured by the ratio of the cache size to the number of address spaces on the disk surfaces.

An example of a mobile disk drive is the IBM Travelstar series, which currently has rotational speeds of between 3800 and 5411 RPM. In contrast, a high-end server drive must have very high performance, i.e., very fast data accesses, and can be quite expensive, enabling a relatively large cache. To optimize performance, as much data with high access times are cached as possible. Examples of server drives include the IBM Ultrastar series, with rotational speeds of between 10,000 and 15,000 RPM. A multi-media drive, in contrast, is optimized for data streaming. The drive must provide consistent performance, i.e., provide data at a constant rate, without any noticeable lags in data retrieval. Data accesses to multi-media drives are almost exclusively sequential; accesses to locations far from locations currently being accessed are highly improbable, and therefore rarely occur more than once. It is therefore not efficient to store such data in cache. In addition to the type of disk drive, variables of the method also include the range of addresses and design of the file for a particular application.

Depending upon the type of computer system, cache buffer 42 varies significantly in size and segmentation. Cache segmentation is in principle selected by a user, but is preferably determined by the application in order to improve efficiency of use. Cache buffer 42 is divided between read cache and write cache. Preferably, the boundaries are dynamic and determined by the cache management scheme. For example, if there are 16 cache lines for holding 16 different data blocks, at any given time there may be between 0 and 16 read cache lines, with the remaining number being write cache lines.

Note that read cache and write cache operations are distinctly different. Read cache stores data that might be transferred in the future from the cache to the host computer, while write cache stores data that must be transferred from the cache to the storage device in the near future. When data is removed from write cache, it must be written to the disk; data in read cache can be removed without requiring further action. Thus the method will be described differently below for read cache and for write cache. In the discussion below, the term "access" refers to accessing a disk or cache for either a read command or write command operation.

Figure 3:
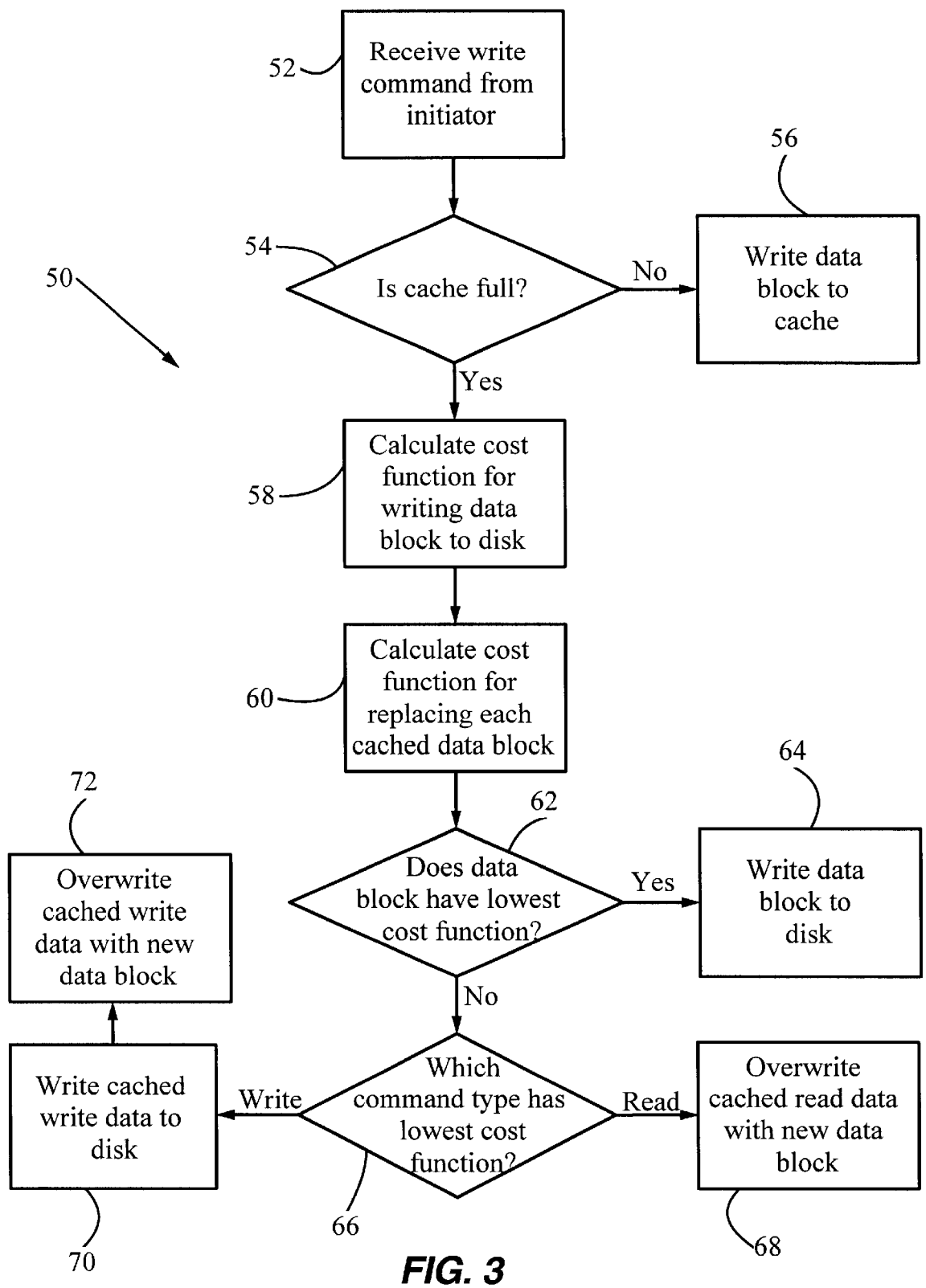
FIG. 3 is a flow diagram of the cache management method of the present invention for processing write commands.

A write cache method 50 of the present invention is illustrated in the block diagram of FIG. 3. The method determines whether a newly received write command should be stored in write cache or written to the disk. In step 52, the disk controller receives a request for a write command from the initiator of the host computer. In step 54, the controller determines whether the cache is full. If it is not full, then the data block corresponding to the write command ("new data block") is written to the cache in step 56. If the cache is full, then the method proceeds to step 58. Step 58 is the key step of the invention: calculating the cost function C for not storing the data in the cache, i.e., for writing it to disk. The cost function is a figure of merit that represents the expected value of the additional cost incurred (in time) for not storing the data in cache, and is generically given by:

$$C=(T_d-T_c)P, \qquad (1)$$

where $T_d$ is the estimated disk access time for the data block, $T_c$ is the estimated cache access time for the data block, and P represents the future access probability for the data block. This generic form of the cost function applies to every case; however, each of the three quantities may vary substantially, as explained further below. In step 60, the cost function is calculated for each data block currently in the cache; note that the components of the cost function may be different for read commands and for write commands in the cache.

In step 62, the cost function computed in step 58 for the new data block is compared with the cost functions computed for the cached data blocks. Clearly, it is most advantageous to the entire system to keep in the cache the data blocks that have the highest expected additional cost for not being stored in the cache. If the new data block has the lowest cost function, then it should not be stored in cache, and must be written directly to disk (step 64). Alternatively, the command may be put in the command queue and executed as determined by the command queue reordering algorithm. If the new data block does not have the lowest cost function, then it will be temporarily stored in the cache, overwriting an existing command, and it remains to determine which existing cached data block will be overwritten. In step 66, the cached data block having the lowest cost function is determined. If the system supports dynamic cache boundaries, then the cached data block to be removed corresponds to either a write command or a read command. If it corresponds to a read command (step 68), then the cached data is overwritten with the new data block. If it corresponds to a write command, then the cached data is first written to disk (step 70) before being overwritten by the new data (step 72).

Figure 4:
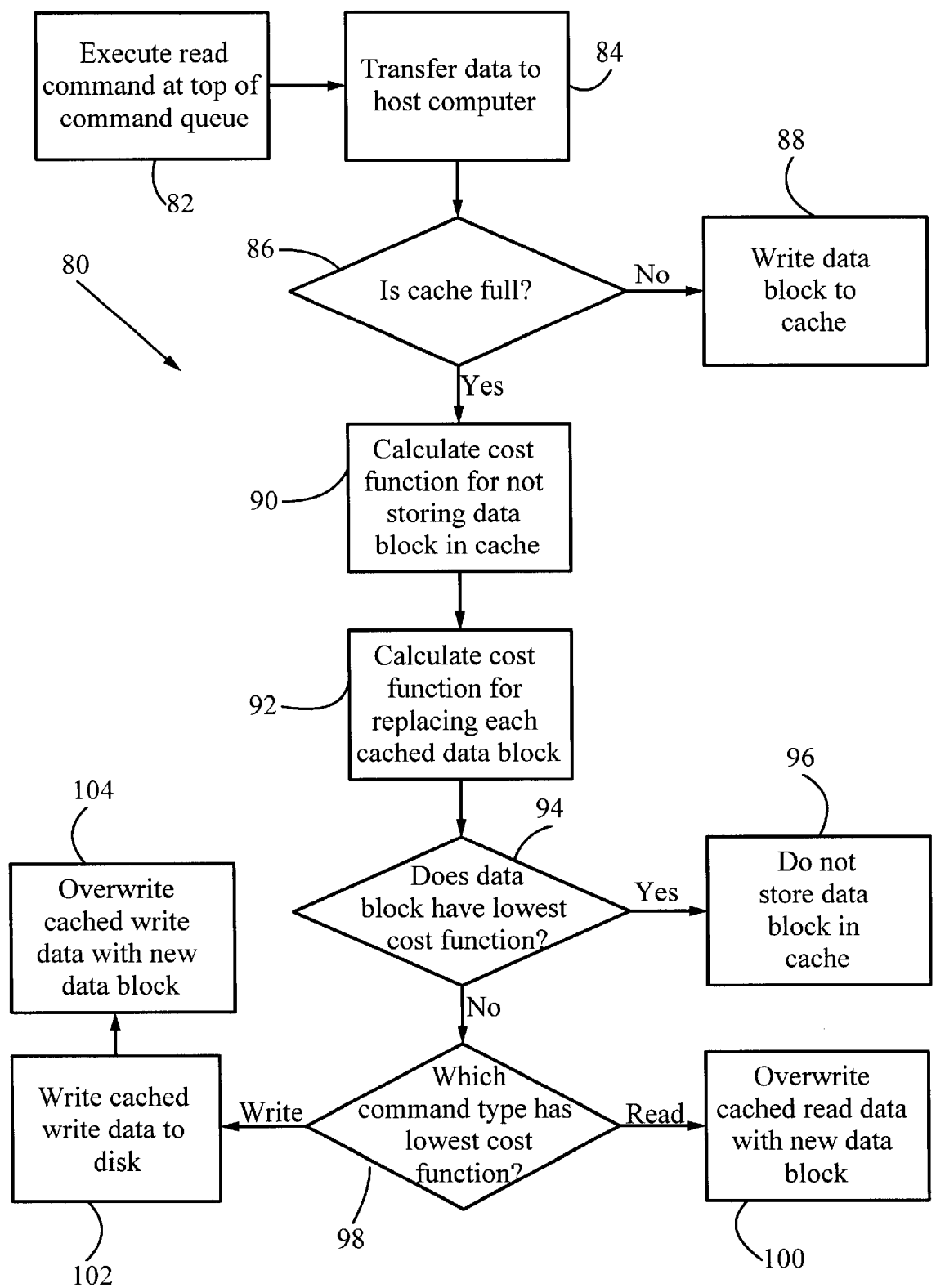
FIG. 4 is a flow diagram of the cache management method of the present invention for processing read commands.

The corresponding method 80 for read caching is illustrated in the block diagram of FIG. 4. Read caching is performed after a disk access, unlike write caching, which occurs before a disk access. In step 82, a read command at the top of the command queue is executed. In step 84, the accessed data is transferred to the host computer. The same data block is also a candidate for being stored in the cache. The value of storing the previously accessed data in cache is based on the assumption that the same data will, with a high probability, be referenced again in the future. First, in step 86, the controller determines whether the cache is full. If not, the data is written to cache in step 88. If the cache is full, the more likely scenario, then the cost function for not storing the data in the cache is calculated in step 90. As in method 50, the cost function represents the expected future additional cost (in time) for not storing the data in cache. The cost function used in method 80 has the same generic form as in Eqn. 1. In step 92, a cost function is calculated for each cached data block; note that the cost function components may differ for read commands and for write commands in the cache. In step 94, the cost function computed in step 90 for the new data block is compared with the cost functions computed for the cached data blocks in step 92. Clearly, it is most advantageous to the entire system to keep in the cache the data blocks that have the highest expected additional cost for not being stored in the cache, i.e., for having to be retrieved from the disk. If the new data block has the lowest cost function, then it is not stored in cache (step 96). If the new data block does not have the lowest cost function, then it will be read into the cache, overwriting an existing command, and it remains to determine which existing cached data block will be overwritten. In step 98, the cached data block having the lowest cost function is determined. If the system supports dynamic cache boundaries, then the cached data block to be removed corresponds either to a write command or to a read command. If it corresponds to a read command (step 100), then the cached data is overwritten with the new data block. If it corresponds to a write command, then the cached data is first written to disk (step 102) before being overwritten by the new data (step 104).

Note that the cost function has a qualitatively different meaning for read and write commands, both for new data and for cached data. For a read command, the expected additional cost is the cost of receiving a request for the data in the future and having to once again retrieve the data from disk, instead of from the cache. For a write command, cached write data will eventually have to be written to disk, and so the expected additional cost measures the difference between writing the data immediately and caching the data immediately to write the data at a future time when the read/write head accesses adjacent data. That is, the cost function for write commands inherently assumes that a future access time for writing to disk is negligible.

Also note that the cost function is an expected value, a probabilistic expression for the future; the estimated additional cost (in time) is weighted by the probability of accessing the data in the future. Clearly, if read data will never be read in the future, then there is no value to keeping it in cache, and conversely no cost to removing it from cache. Similarly, if there is a high probability that future commands will be adjacent to a cached write command, then it is valuable to retain the write data in the cache until such commands are executed, making the current cost of writing the data to disk, i.e., removing it from cache, high. It is unlikely that data corresponding to a read command will replace cached data corresponding to a write command, because such a process requires a guaranteed additional disk access. In order for new read data to replace cached write data, the read command must have a very high access time and high probability of future access, while the write command must have a currently low access time and low probability that adjacent data will be accessed in the future.

The first term of the cost function, $T_d$, represents the estimated time for accessing the disk location corresponding to the command, preferably calculated according to an RPO algorithm. Note that the access time is an estimated access time for a number of reasons. First, the actual access time will be determined by the position of the head when it completes executing the command immediately prior to the new command, and so it is impossible to predict a future actual access time. Second, access times are in general probabilistic; that is, performing the identical seek between commands a large number of times results in a distribution of access times rather than a single time. The access time estimation preferably takes into account the entire contents of the command queue, thus providing a reasonable estimate of where the actuator will be in the near future. Any method for estimating $T_d$ that uses an RPO algorithm and considers all commands in the command queue is within the scope of the present invention. A person of average skill in the art will be able to calculate $T_d$ as constrained by the system requirements and specifications. For example, $T_d$ may be computed by calculating the estimated access time between each command in the queue and the new data command, and averaging the times. Alternatively, only commands whose distance (in time) from the new command is below a threshold value are combined to obtain the average. Alternatively, $T_d$ may simply be the estimated access time between the new data and the closest command in the command queue.

Figure 5:
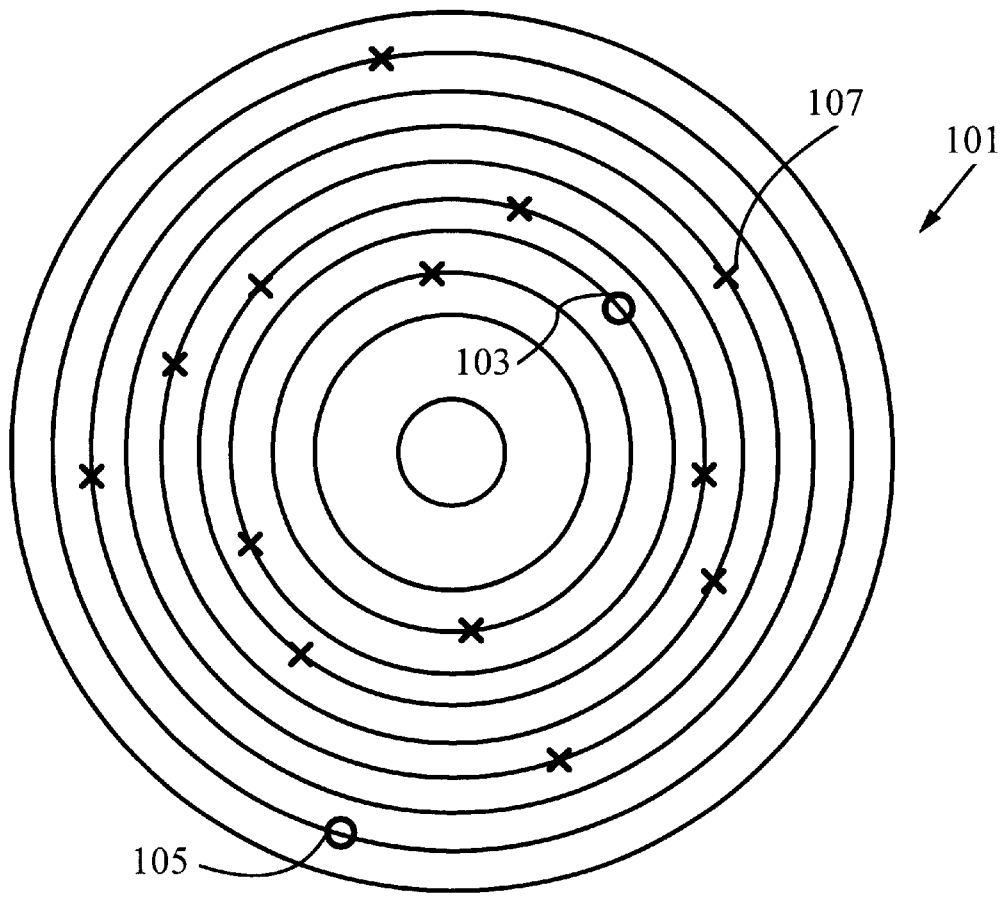
FIG. 5 is a schematic diagram of a disk surface illustrating locations of data corresponding to commands in the command queue (x's) and cached data (o's).

A disk surface 101 containing concentric tracks is illustrated in FIG. 5. The x's mark the locations of data corresponding to commands in the command queue. The o's illustrate two locations of data for which the cost function is being calculated. Intuitively, circle 103 appears to represent data that is less valuable to store in cache than data represented by circle 105. Circle 103 is relatively close to a number of commands in the command queue, while circle 105 is farther from most of the commands. Quantitatively, circle 103 is closer to its nearest neighbor, closer to its group of near neighbors, and, on average, closer to all commands in the command queue. It is likely that if the data represented by circle 103 were required in the future, it could be accessed relatively quickly from any command in the queue. In contrast, the data represented by circle 105 most likely requires a long access time. The method calculates a high access time for data 105, and data 105 is stored in the cache.

The individual access times used to obtain $T_d$ are calculated using a standard RPO algorithm. Of course, the actual values calculated depend upon the geometry and other details of the disk drive. The algorithm sums the average seek time between the specified tracks and the time for the disk to rotate from the end of the final sector of the first command to the beginning of the first sector of the second command. The head, track, and sector of each command is computed from the LBA of the command. Note that the RPO algorithm is not a function of the total linear distance or radial plus circumferential distance between data blocks. For example, if the head is moving between data 107 and 103, it might reach the appropriate track just after data 103 rotates under the head, requiring a full rotational time to be added to the access time. It is the total distance traversed, as measured in access time, that is important.

The RPO algorithm can be calculated differently depending on whether the second command is a write command or a read command. When the actuator seeks, it continues to vibrate for a finite amount of time after arriving at its final location. Before data is written to disk, the actuator must be quiescent to prevent damage to adjacent data. In contrast, target data can be read when the actuator is not completely quiescent. Thus the estimated seek times are slightly lower for read commands than for write commands.

The second term in the cost function, $T_c$, represents the time to retrieve data from the cache. While $T_c$ varies for different cache locations and types of commands, as known in the art, it is typically at least one and up to three orders of magnitude smaller than $T_d$. Thus for the overwhelming majority of commands and for current and near future disk drives, $T_c$ is negligible in comparison with $T_d$ and can be ignored when computing the cost function.

The final term of the cost function, P, the probability of future access, has the most variation. All of the factors described below can be nonlinearly combined to obtain P. P can also be weighted differently depending upon the type of command, type of disk drive, or system requirements. In a simple case, the probability that a future read command references the data block in question is proportional to the instantaneous cache hit ratio, either an average value or the value for the particular data block. Monitoring the cache hit ratio is a standard function of disk drive controllers. Since the complete history of cache hits is available, it is preferable to use the monitored history of the particular cache block in calculating P. Of course, new read data that is a candidate for adding to cache has no measured hit ratio. Its access probability may be estimated from the hit ratio of cached data located close to the new data, or from the occurrence of commands in the command queue that are near to the new data. The cache hit ratio is a function of the cache size; a larger cache should have a higher hit ratio. Thus it is expected that the access probability is systematically higher for disk drives having larger caches, e.g., high-end server drives.

The commands in the command queue can also contribute to the value of the access probability. The command queue indicates the type and recurrence of existing commands, which may be used to predict the likelihood of future occurrence of other commands.

The access probability preferably includes a contribution related to the likelihood of randomly located commands, i.e., commands for data whose logical block addresses are not sequential or otherwise related. The likelihood of randomly located commands is itself related to the type of disk drive. For example, multi-media drives are unlikely to receive random commands. Requests for such outlying data are almost never repeated, and it is therefore not cost effective to cache randomly located data. P for multi-media drives is therefore scaled by the proximity of the new command to existing commands in the command queue and cache. In contrast, high-end server disk drives are optimized for random access performance; that is, fast access of randomly located data is valued. Data having a very large access time is therefore likely to be stored in the cache of a server drive. Random access is accounted for in $T_d$; it can also be included in P in order to give additional weight to the distance between the data in question and the commands in the command queue.

The access probability P also differs for read and write commands. In order to minimize the replacement of cached write data with read data, access probabilities for write commands can be made artificially high, or can be different depending upon whether the new command is a read or write command.

Another factor contributing to P is the effect of command clustering. In practice, the geometric location of commands is not evenly scattered, but tends to cluster in regions of a disk surface. To minimize overall access times, it is highly desirable for the read/write head to remain in one region of the drive while executing a number of commands, and then move to a different region to begin executing a different cluster of commands. The command queue reordering method inherently enables this command clustering, moving to the front of the queue commands that are near the command currently being executed. While the disk drive works most efficiently if the head is able to remain in one location for a period of time, this behavior is highly undesirable from the point of view of the application running on the host computer. If one of the clusters contains mostly write commands and the other mostly read commands, as is often the case, there is a chance that the write commands will continue to be deferred.

A standard write cache addresses exactly this problem, allowing the host computer to be notified that the data has been written, without actually paying the price of moving the actuator to write the data to disk. The write data remains in the cache until the head is moved to the region where the write commands are clustered, at which point all the commands are written to disk. In prior art cache systems, all incoming write commands are written to the cache, regardless of their relative locations. After a predetermined time, the write cache becomes full, and the cached data must be written to disk. In the present invention, the access probability of a write command is in part determined by the other write commands in the cache. If the cache contains a large number of write commands that are clustered together, then the distance between the new command and the cluster is determined. If the new command falls within the cached cluster, then it has a high probability of future access, and is preferably added to cache. If the new command does not fall within the cluster, then it should not overwrite a cached command within the cluster, even if the new command has a high access time; this fact is reflected in the low future access probability assigned to the command. Note that the analogous scenario does not apply to read commands.

In general, there is a higher level control within the disk controller that ensures that cached write data is eventually written to disk. For example, there may be a time limit placed on cached write data. After the write data remains in write cache for a time period longer than the limit, it will be written to disk, regardless of the access time required. Note that if write data is stored in cache, it is inherently assumed that future commands will be adjacent to the data. When the future commands are being executed, the command queue will now reflect the low access times of the cached data, and the cached data will most likely be replaced by new write data.

The present invention provides a synergistic effect between the command queue and the disk cache. Because commands that have high access times are preferentially maintained in cache, the overall time to data of the commands in the command queue is necessarily decreased. These improvements occur without requiring fundamental changes to the command queue reordering scheme; they simply make use of the existing information in the queue about where commands are located currently and in the near future. The disk controller has a higher level control scheme that determines whether current transducer movement corresponds to commands in the command queue or commands from cache. For example, if write data is being replaced in cache, then it must be immediately written to disk. However, the initiator has already been notified that this data has been written, and so the command cannot be added to the command queue. The command queue must be interrupted so that the cached command can be written to disk. Overall, however, the cache and queue decisions are asynchronous to provide the most system flexibility.

Figure 6:
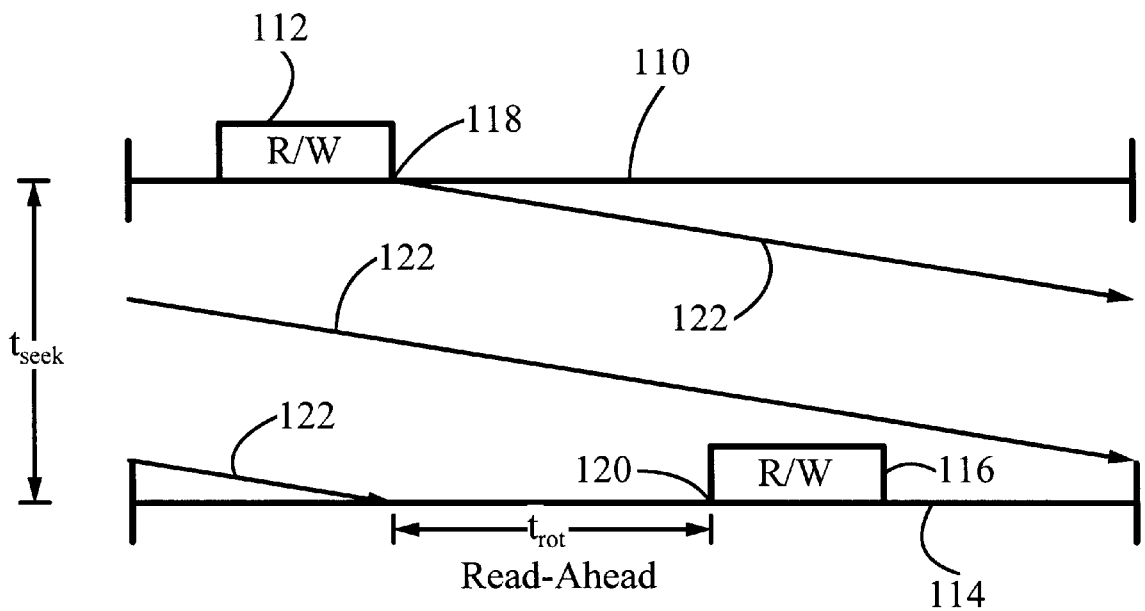
FIG. 6 is a schematic diagram illustrating a read-ahead operation.

The present invention can also be advantageously applied to the prior art concept of read-ahead, in which data rotating under the read/write head while the head awaits the target data is read into the cache. Most disk drives have a stationary read-ahead setting that can be set by the user. Read-ahead provides significant cost savings, because it is typically very likely that data adjacent to the target data will be requested in the future. This data is retrieved at essentially no cost, since no movement of the transducer beyond what is already necessary is required. The RPO algorithm provides a very useful method of evaluating read-ahead data, as illustrated in FIG. 6. Line 110 represents the time for the head to traverse the full circumference of a source cylinder or track. Block 112 represents the time during which a source data transfer (read or write) is performed. The two endpoints of line 110 represent times at which the head crosses same point in space. Line 114 represents the time for the head to traverse a destination track or cylinder containing target data transferred at a time represented by block 116. A read or write command to access target data 116 (the destination command) is executed after a read or write command to access target data 112 (the source command). After the source command is completed at time 118, the head moves to the beginning of the destination sector, arriving at time 120. The latency time between times 118 and 120 is calculated according the RPO algorithm as the sum of seek time $t_{seek}$ and rotational latency $t_{rot}$. The seeking movement of the actuator occurs along the path represented by lines 122. As shown, the disk cylinder completes two full rotations as the actuator moves. In this example, the head switch occurs during seeking. After the head arrives at the correct destination sector, it waits while the disk rotates underneath for a time $t_{rot}$, after which the data transfer occurs. It is during the time $t_{rot}$ that read-ahead can occur: data in the destination track between the arrival sector and destination sector can be read into cache. Note that this explanation is somewhat simplified, as most disk drives use track skewing and zone recording, so that sectors of different tracks are not typically aligned. However, the same principles apply to realistic systems.

Figure 7A:
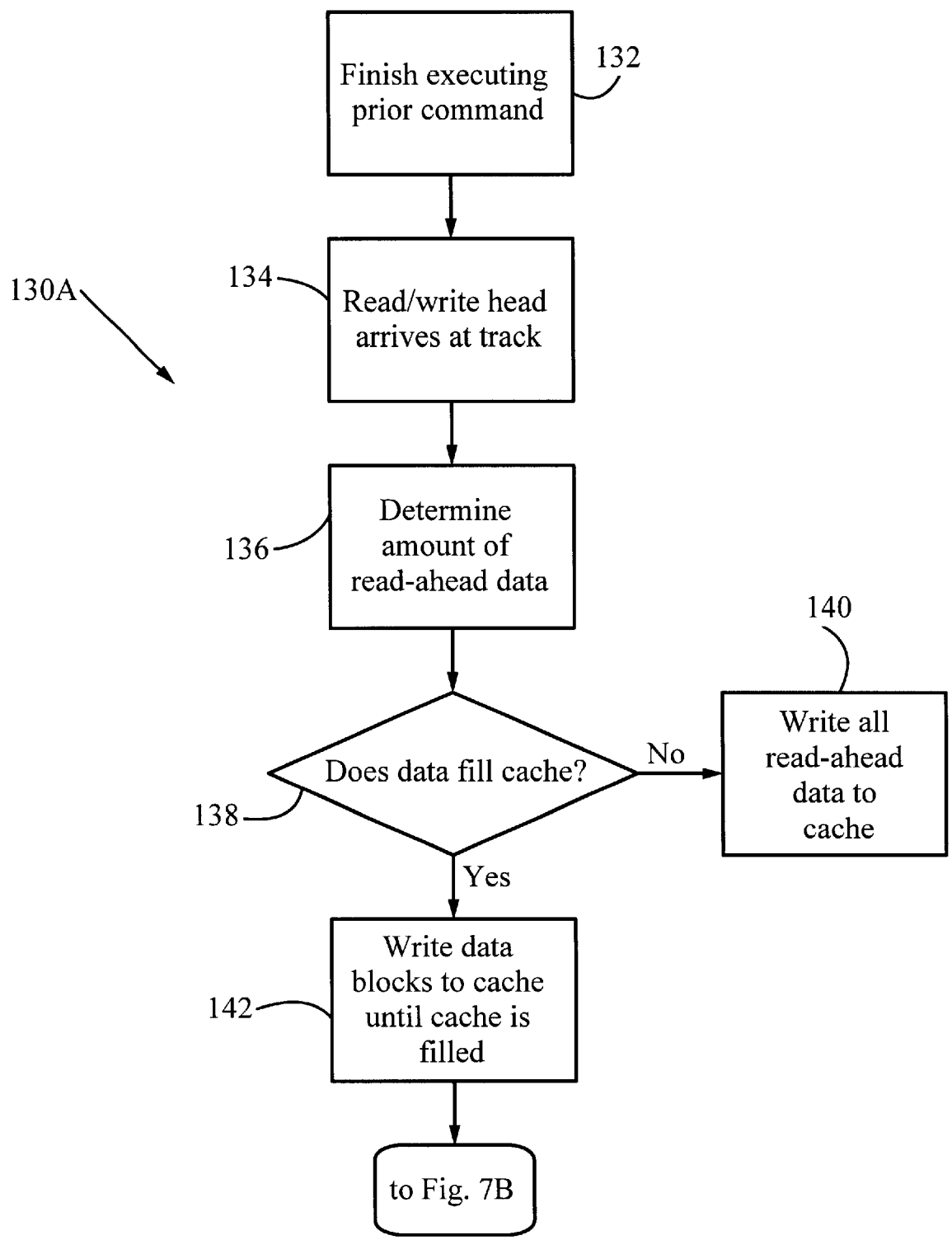
FIGS. 7A–7B are flow diagrams of the cache management method of the present invention for processing read-ahead operations.
Figure 7B:
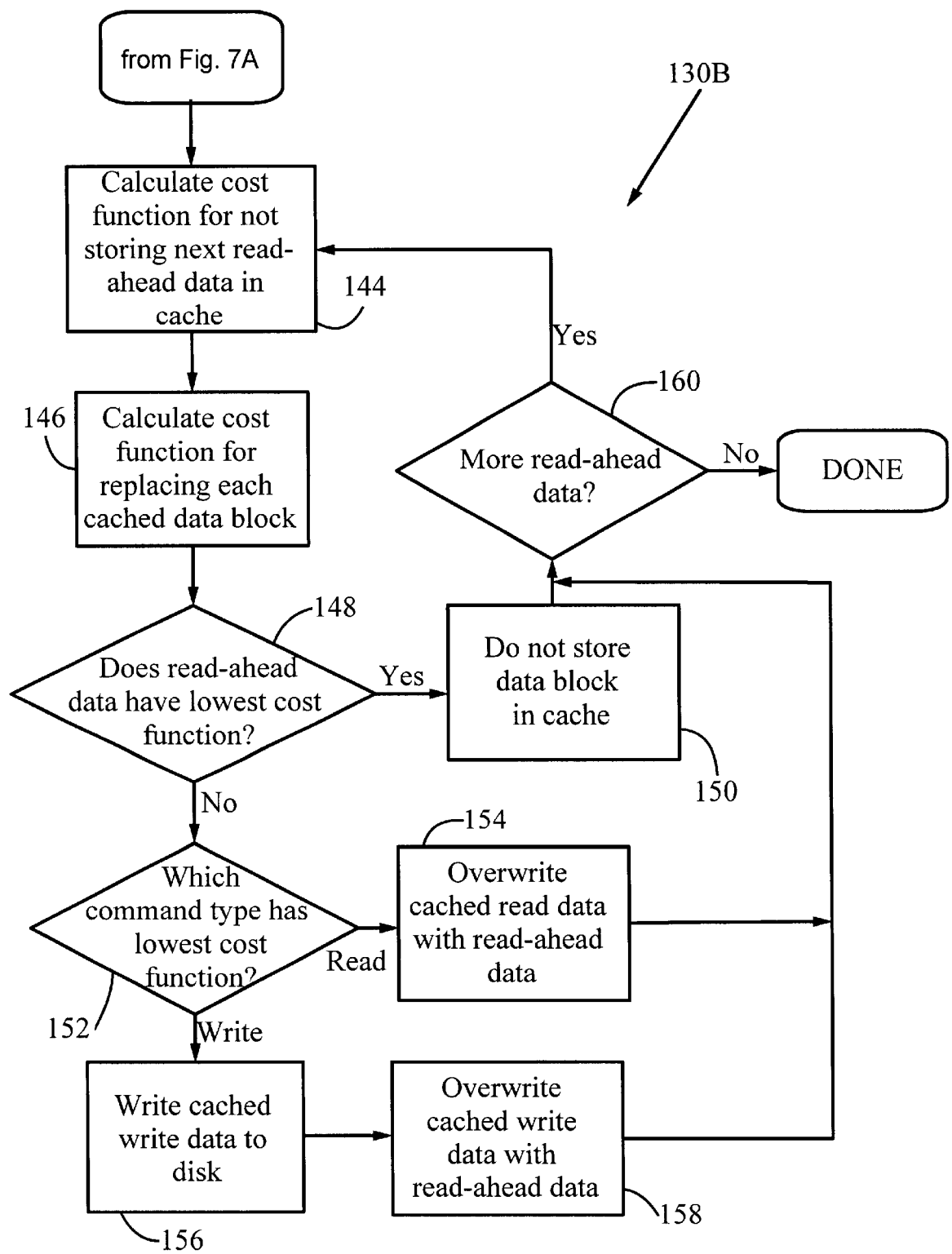

FIGS. 7A–7B illustrate the method 130 of the present invention for cache management during a read-ahead operation. For ease of presentation, the method is divided into two flow diagrams 130A and 130B. In a first step 132, the prior command (i.e., the source command) is executed, leaving the head at time 118 of FIG. 6. The actuator seek is effected, and in step 134, the head arrives at the destination track, i.e., line 114 of FIG. 6. In step 136, the amount of data to be read during read-ahead is determined. Step 136 can be determined during actuator movement, or, preferably, completely independently from method 130. Step 136 involves a standard method for determining how much data should be read during read-ahead. A variety of methods are known in the art; any suitable method may be used. The method takes into account the total access range and cache size. The total access range is the range of logical block addresses accessed during a predetermined time period, and is monitored by an integrator algorithm that continually updates the range as necessary. More data can obviously be read for a larger cache. The value of $t_{rot}$ is known from the RPO algorithm. If $t_{rot}$ covers a range of data larger than the amount to be read into cache, then the beginning of the read-ahead precedes time 120 by an amount sufficient to read the identified amount of data into the cache. If $t_{rot}$ covers a data amount smaller than or equal to the calculated amount, then data transfer occurs as soon as the head arrives at the destination track.

After the amount of data to be read during read-ahead is determined, the controller must determine whether there are more empty cache lines than data blocks read (step 138). If so, then all data is written to the cache in step 140. If not, then read-ahead data is written into cache until the cache is filled (step 142). Continuing with FIG. 7B, each read-ahead data block must be evaluated to determine whether it should be stored in the cache or not. In step 144, the cost function is calculated for the next read-ahead data block. In step 146, the cost function is calculated for each cached data block. If the read-ahead block has the lowest cost function (step 148), then it is not written to disk (step 150). If not, the read-ahead block will be read into the cache. In step 152, the cached data block having the lowest cost function is determined. If the system supports dynamic cache boundaries, then the cached data block to be removed corresponds to either a write command or a read command. If it corresponds to a read command (step 154), then the cached data is overwritten with the read-ahead data block. If it corresponds to a write command, then the cached data is first written to disk (step 156) before being overwritten by the read-ahead data (step 158). In both cases, the method proceeds to step 160. If there are more read-ahead cache blocks to consider, then the method returns to step 144. Note that step 146 is only performed for cached data blocks for which the cost function was not calculated in previous iterations.

It will be clear to one skilled in the art that the above embodiment may be altered in many ways without departing from the scope of the invention. Accordingly, the scope of the invention should be determined by the following claims and their legal equivalents.

What is claimed is:

1. A method for optimizing performance of a data storage system comprising a direct access storage device (DASD), a data cache, and a command queue of commands for accessing data stored on said DASD, said method comprising:
   a) receiving a data block;
   b) calculating a cost function C for not storing said data block in said data cache, wherein said cost function is given by $$C=(T_d-T_c)P,$$

wherein $T_d$ is an access time for accessing said data block in said DASD, $T_c$ is an access time for accessing said data block in said data cache, and P is an access probability for said data block;
   c) calculating analogous cost functions for cached data blocks in said data cache; and
   d) replacing a selected cached data block with said data block, wherein said selected cached data block has a cost function that is lower than said cost function of said data block.

2. The method of claim 1 wherein $T_d$ is calculated in dependence on said commands in said command queue.

3. The method of claim 2 wherein $T_d$ is calculated in dependence on logical block addresses of said commands in said command queue.

4. The method of claim 2 wherein $T_d$ comprises an average value of access times between each of said commands in said command queue and said data block.

5. The method of claim 1 wherein $T_d$ is calculated according to a rotational positioning optimization (RPO) algorithm.

6. The method of claim 1 wherein P is calculated in dependence on a value selected from the group consisting of a relative cache size, a performance requirement of said data storage system, and a cache hit ratio.

7. The method of claim 1 wherein P is calculated in dependence on said cached data blocks.

8. The method of claim 1 wherein said selected cached data block has a lowest cost function.

9. The method of claim 1 wherein said data block is received from a host computer and corresponds to a write command.

10. The method of claim 1 wherein said data block is received from said DASD during execution of a read command.

11. The method of claim 10 wherein said data block is received from said DASD during a read-ahead operation.

12. The method of claim 1 wherein said selected cache data block corresponds to a write command, and said method further comprises writing said replaced cached data block to said DASD.

13. The method of claim 1 wherein said DASD is a magnetic disk drive.

14. A disk controller for a disk drive, comprising:
   a) a data cache buffer;
   b) a command queue of commands for accessing data stored on said disk drive;
   c) means for calculating a cost function C for not storing a data block in said data cache buffer, wherein said cost function is given by $$C=(T_d-T_c)P,$$

wherein $T_d$ is an access time for accessing said data block in said disk drive, $T_c$ is an access time for accessing said data block in said data cache buffer, and P is an access probability for said data block;
   d) means for calculating analogous cost functions for cached data blocks in said data cache buffer; and
   e) means for replacing a selected cached data block with said data block, wherein said selected cached data block has a cost function that is lower than said cost function of said data block.

15. The disk controller of claim 14 wherein $T_d$ is calculated in dependence on said commands in said command queue.

16. The disk controller of claim 15 wherein $T_d$ is calculated in dependence on logical block addresses of said commands in said command queue.

17. The disk controller of claim 15 wherein $T_d$ comprises an average value of access times between each of said commands in said command queue and said data block.

18. The disk controller of claim 14 wherein $T_d$ is calculated according to a rotational positioning optimization (RPO) algorithm.

19. The disk controller of claim 14 wherein P is calculated in dependence on a value selected from the group consisting of a relative cache size, a performance requirement of said disk drive and said disk drive controller, and a cache hit ratio.

20. The disk controller of claim 14 wherein P is calculated in dependence on said cached data blocks.

21. The disk controller of claim 14 wherein said selected cached data block has a lowest cost function.

22. The disk controller of claim 14 wherein said data block is received from a host computer and corresponds to a write command.

23. The disk controller of claim 14 wherein said data block is received from said disk drive during execution of a read command.

24. The disk controller of claim 23 wherein said data block is received from said disk drive during a read-ahead operation.

* * * * *